United States Patent
Stanley et al.

(10) Patent No.: US 8,218,411 B2
(45) Date of Patent: Jul. 10, 2012

(54) COMPACT DISC PLAYER AND METHOD FOR CONTROLLING EJECTION OF A COMPACT DISC FROM THE COMPACT DISC PLAYER

(75) Inventors: Robert W. Stanley, Peru, IN (US); Gary K. Mitchell, Kokomo, IN (US); Michael S. Vanderipe, Carmel, IN (US); Boon H. Oun, Singapore (SG)

(73) Assignee: Delphi Technologies, Inc., Troy, MI (US)

( * ) Notice: Subject to any disclaimer, the term of this patent is extended or adjusted under 35 U.S.C. 154(b) by 1468 days.

(21) Appl. No.: 11/352,110

(22) Filed: Feb. 10, 2006

(65) Prior Publication Data
US 2006/0181969 A1 Aug. 17, 2006

Related U.S. Application Data

(60) Provisional application No. 60/652,285, filed on Feb. 11, 2005.

(51) Int. Cl.
*G11B 11/00* (2006.01)
(52) U.S. Cl. .................................. 369/53.21
(58) Field of Classification Search ............... 369/53.18, 369/116, 120, 53.26, 47.39, 47.44
See application file for complete search history.

(56) References Cited

U.S. PATENT DOCUMENTS

| | | | | |
|---|---|---|---|---|
| 4,399,528 | A * | 8/1983 | Suzuki | 369/75.11 |
| 5,689,292 | A * | 11/1997 | Suzuki et al. | 347/17 |
| 6,282,608 | B1 | 8/2001 | Dziekan | 711/112 |
| 6,631,969 | B2 * | 10/2003 | Nagoshi et al. | 347/19 |
| 6,738,330 | B2 * | 5/2004 | Shumura et al. | 369/53.18 |

* cited by examiner

*Primary Examiner* — Mohammad Ghayour
*Assistant Examiner* — Parul Gupta
(74) *Attorney, Agent, or Firm* — Lawrence D. Hazelton

(57) ABSTRACT

A compact disc player and a method and an article of manufacture for controlling ejection of a compact disc are provided. The compact disc player includes a temperature sensor configured to generate a signal indicative of a temperature of the compact disc player utilizing a temperature sensor. The compact disc player further includes a controller operably communicating with the temperature sensor. The controller is configured to determine an ejection time interval value based on the signal. The controller is further configured to energize a motor coupled to a drive mechanism for a time internal corresponding to the ejection time interval value to induce the drive mechanism to move a compact disc to a predetermined position outwardly from a housing.

8 Claims, 5 Drawing Sheets

COMPACT DISC PLAYER AND METHOD FOR CONTROLLING EJECTION OF A COMPACT DISC FROM THE COMPACT DISC PLAYER

CROSS REFERENCE TO RELATED APPLICATIONS

The application claims the benefit of U.S. Provisional application Ser. No. 60/652,285, filed Feb. 11, 2005, the contents of which are incorporated herein by reference thereto.

TECHNICAL FIELD

This application relates to a compact disc player and a method for controlling ejection of a compact disk from the compact disc player.

BACKGROUND

Compact disc players are commonly used in mobile environments such as vehicles and boats for example. A compact disc player reads data contained in an optical surface of a compact disc and plays music or other sounds as instructed by the data read from the disc. It is desirable that the optical surface of the compact disc remain free of marks or scratches that may impair the compact disc players' ability to properly read the data contained in the optical surface.

The compact disc player utilizes a motor to move an actuating device to eject a compact disc from the compact disc player through a slot in a face-plate of the compact disc player. Further, temperature variations of the compact disc player can vary friction levels of mechanical components of the actuating device. For example, at relatively cold temperature levels an amount of friction between mechanical components of the actuating device can increase. Accordingly, during relatively cold temperature levels, a predetermined amount of time that the motor is energized may not be sufficient to move the compact disc to a desired ejection position. As a result, the compact disc may not protrude far enough from the face-plate of the compact disc player for a user to remove the compact disc therefrom. Further, for example, at relatively hot temperature levels an amount of friction between mechanical components of the actuating device can decrease. Accordingly, during relatively hot temperature levels, a predetermined amount of time that the motor is energized may be greater than needed. As a result, the compact disc can protrude further than desired from the face-plate of the compact disc player and fall away from the compact disc player.

SUMMARY OF THE INVENTION

A method for controlling ejection of a compact disc from a compact disc player in accordance with the exemplary embodiment is provided. The method includes generating a signal indicative of a temperature of the compact disc player utilizing a temperature sensor. The method further includes determining an ejection time interval value based on the signal, utilizing a controller. The method further includes energizing a motor coupled to a drive mechanism for a time internal corresponding to the ejection time interval value to induce the drive mechanism to move the compact disc to a predetermined position outwardly from the compact disc player, utilizing the controller.

A compact disc player in accordance with another exemplary embodiment is provided. The compact disc player includes a temperature sensor configured to generate a signal indicative of a temperature of the compact disc player utilizing a temperature sensor. The compact disc player further includes a controller operably communicating with the temperature sensor. The controller is configured to determine an ejection time interval value based on the signal. The controller is further configured to energize a motor coupled to a drive mechanism for a time internal corresponding to the ejection time interval value to induce the drive mechanism to move a compact disc to a predetermined position outwardly from a housing.

An article of manufacture in accordance with another exemplary embodiment is provided. The article of manufacture includes a computer storage medium having a computer program encoded therein for controlling ejection of a compact disc from a compact disc player. The computer storage medium includes code for receiving a signal indicative of a temperature of the compact disc player from a temperature sensor. The computer storage medium further includes code for determining an ejection time interval value based on the signal. The computer storage medium further includes code for energizing a motor coupled to a drive mechanism for a time internal corresponding to the ejection time interval value to induce the drive mechanism to move the compact disc to a predetermined position outwardly from the compact disc player.

DESCRIPTION OF EXEMPLARY EMBODIMENTS

Figure 1:
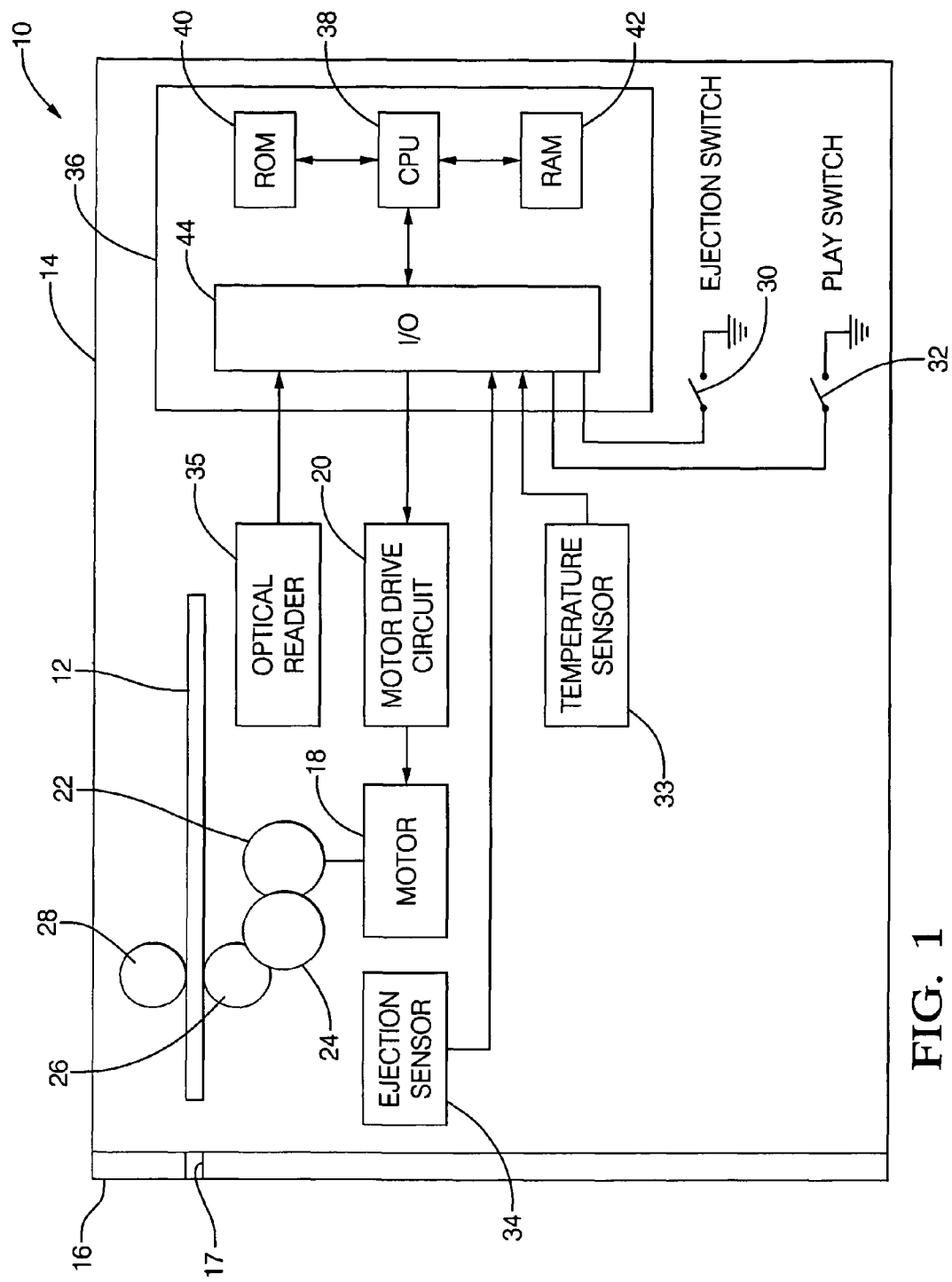
FIG. 1 is a block diagram of a compact disc player in accordance with an exemplary embodiment having a compact disc disposed therein.
Figure 2:
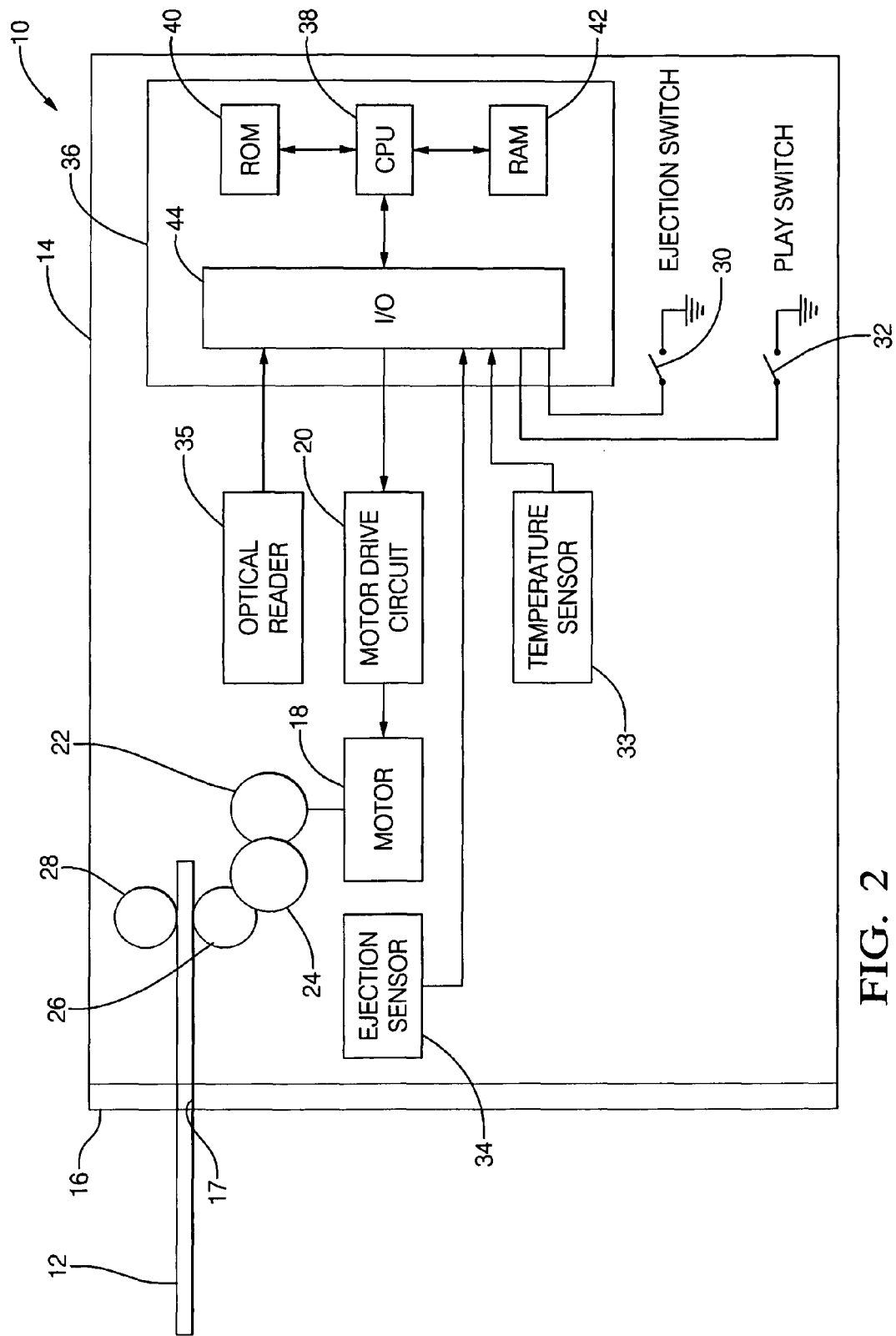
FIG. 2 is a block diagram of the compact disc player of FIG. 1 having a compact disc disposed in an ejection position relative to the compact disc player.

Referring to FIGS. 1 and 2, a compact disc player 10 for reading data from a compact disc 12 is illustrated. The compact disc player 10 includes a housing 14, a face-plate 16, a motor 18, a motor drive circuit 20, drive gears 22, 24, a roller 26, a guide pin 28, an ejection switch 30, a play switch 32, a temperature sensor 33, an ejection sensor 34, an optical reader 35, and a controller 36.

The housing 14 and the face-plate 16 are provided to enclose the other components of the compact disc player 10. The face-plate 16 is disposed across an end of the housing 14 and includes an aperture 17 extending therethrough. During ejection of a compact disc 12, a compact disc 12 is moved from an interior region of the housing 14 through the aperture 17 to a region exterior of the housing 14.

The motor drive circuit 20 is provided to generate signals for controlling operation of the motor 18, in response to a control signal from the controller 36. In response to the signals from the circuit 20, the motor 18 drives a drive mechanism to eject the compact disc 12 at least partially from the housing 14. In particular, the motor 18 drives the drive gears 22, 24 to rotate a roller 26 at a predetermined rotational speed for a predetermined time interval to eject the compact disc 12 from the housing 14. During rotation of the roller 26, the roller 26 contacts the bottom surface of the compact disc 12 to move the compact disc 12 toward the aperture 17 of the face-plate 16 and at least partially through the aperture 17. The guide pin 28 is a stationary guide pin to assist in guiding the compact disc 12 toward the aperture 17.

The ejection switch 30 is provided to allow a user to induce the compact disc player 10 to eject the compact disc 12 therefrom. In particular, the ejection switch 30 can be moved to a closed operational position to induce the compact disc player 10 to eject the compact disc 12 therefrom. The ejection switch 30 is electrically coupled to the input/output (I/O) interface 44 of the controller 36.

The play switch 32 is provided to allow user to induce the compact disc player to read data from the compact disc 12. In particular, the play switch 32 can be moved to a closed operational position to induce the compact disc player 10 to read data from the compact disc 12. The play switch 32 is electrically coupled to the I/O interface 44 of the controller 36.

The temperature sensor 33 is provided to generate a signal indicative of a temperature of the compact disc player 10. In one exemplary embodiment, the temperature sensor 33 comprises a thermistor disposed within the housing 14. In another exemplary embodiment, the temperature sensor 33 is disposed external of the housing 14. The temperature sensor 33 is electrically coupled to the I/O interface 44 of the controller 36.

The ejection sensor 34 is provided to detect when the compact disc 12 is moving through the aperture 17 of the face-plate 16. In particular, the ejection sensor 34 generates a signal when the compact is 12 is detected moving proximate the aperture 17 of the face-plate 16. The ejection sensor 34 is electrically coupled to the I/O interface 44 of the controller 36.

The optical reader 35 is disposed proximate the compact disc 12 for reading data from the compact disc 12. In particular, the optical reader 35 reads data from the compact disc 12 in response to a control signal from the controller 36. The optical reader 35 is electrically coupled to the I/O interface 44 of the controller 36.

The controller 36 is provided to control operation of the optical reader 35 and the motor drive circuit 20. In particular, the controller 36 is provided to execute software algorithms for controlling operation of the motor 18 to eject the compact disc 12 from the housing 14. The controller 36 includes a central processing unit (CPU) 38, a read-only memory (ROM) 40, a volatile memory such as a random access memory (RAM) 42 and the I/O interface 44. The CPU 38 operably communicates with the ROM 40, the RAM 42, and the I/O interface 44. The computer readable media including ROM 40 and RAM 42 may be implemented using any of a number of known memory devices such as PROMs, EPROMs, EEPROMS, flash memory or any other electric, magnetic, optical or combination memory device capable of storing data, some of which represent executable instructions used by the CPU 38. The CPU 38 communicates via the I/O interface 44 with the optical reader 35 and the motor drive circuit 20. Further, the CPU 38 receives signals via the I/O interface 44 from the ejection switch 30, the play switch 32, the ejection sensor 34 and the temperature sensor 34.

Figure 3:
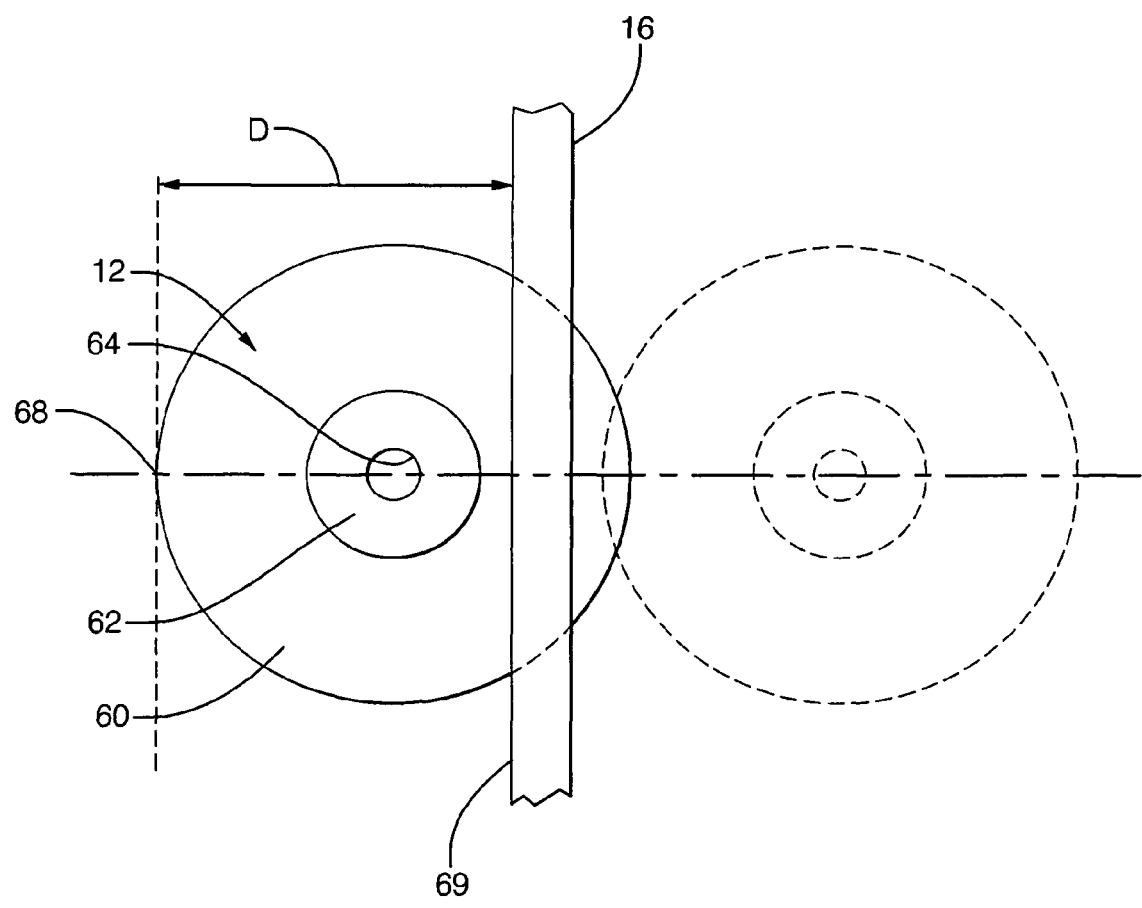
FIG. 3 is a top view of a compact disc at the ejection position with respect to a face-plate of the compact disc player of FIG. 1.

Referring to FIG. 3, the compact disc 12 is provided to store data therein which can be read by the compact disc player 10. The compact disc 12 includes a data storage portion 60 and a lead-in ring 62. The data storage portion 60 is configured to store data therein and surrounds the lead-in ring 62. The lead-in ring 62 is utilized to contact a roller for rotating the compact disc 12 when reading data from the compact disc 12. The lead-in ring 62 includes an aperture 64 extending therethrough. The aperture 64 is provided to allow a user to remove the compact disc 12 from the compact disc player when at least the aperture 64 is exposed external of the face-plate 16 and the housing 14. As shown, when the compact disc 12 is ejected from the face-plate 16, a front edge 68 of the compact disc 12 should be a distance "D" away from an outer surface 69 of the face-plate 16, which is a desired ejection position.

Before providing a detailed description of a method for controlling ejection of a compact disc 12 from the compact disc player 10, a general overview of the theory behind the method will now be explained. As noted above, temperature variations of the compact disc player 10 can vary an amount of friction between mechanical components of the compact disc player 10. For example, when the compact disc player 10 is operated at relatively cold temperature levels, the mechanical components therein have a relatively high amount of friction therebetween. Thus, during relatively cold temperature levels, it would be desirable to increase the ejection time interval when moving the compact disc 12 toward a desired ejection position to ensure that the compact disc 12 is moved to the desired ejection position. Alternately, for example, when the compact disc player 10 is operated in relatively hot temperature levels, the mechanical components therein have a relatively low amount of friction therebetween. Thus, during relatively hot temperature levels, it would be desirable to decrease the ejection time interval to ensure that the compact disc 12 is moved to the desired ejection position.

Figure 4:
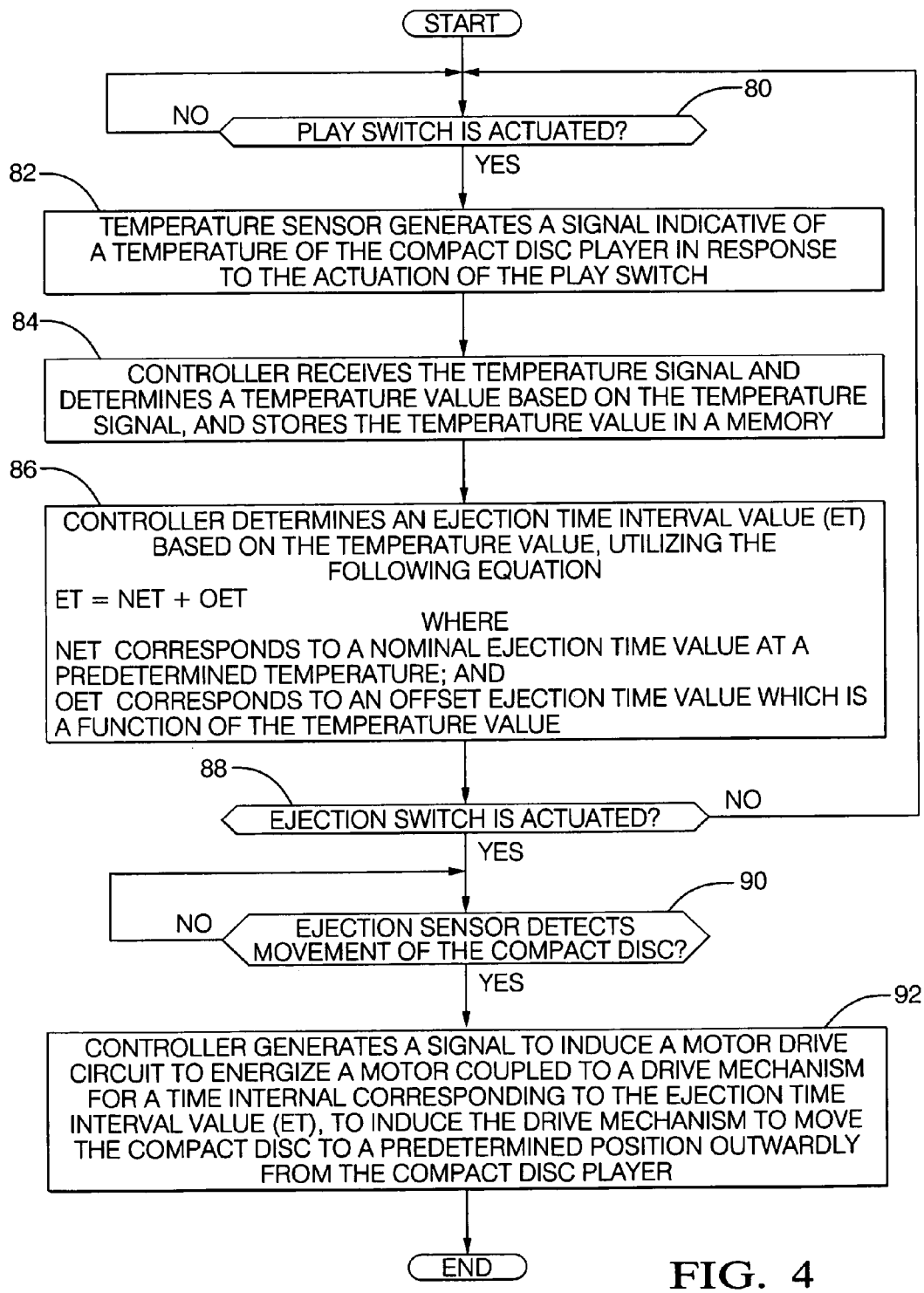
FIG. 4 is a flowchart of a method for controlling ejection of a compact disc from a compact disc player in accordance with another exemplary embodiment.

Referring to FIG. 4, a method for controlling ejection of a compact disc 12 from the compact disc player 10 will now be explained. In one exemplary embodiment, the method can be implemented utilizing software algorithms stored within a memory of the controller 36.

At step 80, the controller 36 makes a determination as to whether the play switch 32 has been actuated. If the value of step 80 equals "yes", the method advances to step 82. Otherwise, the method returns to step 80.

At step 82, the temperature sensor 33 generates a signal indicative of a temperature of the compact disc player 10 in response to the actuation of the play switch 32.

At step 84, the controller 36 receives the temperature signal and determines a temperature value based on the temperature signal, and stores the temperature value in a memory 42.

At step 86, the controller 36 determines an ejection time interval value (ET) based on the temperature value, utilizing the following equation:

$$ET = NET + OET, \text{ where}$$

Figure 5:
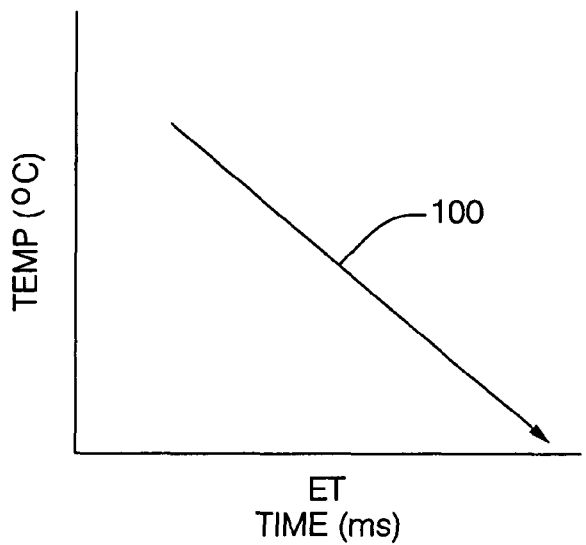
FIG. 5 is a graph of a curve illustrating ejection time interval values based on temperature values of the compact disc player.
Figure 6:
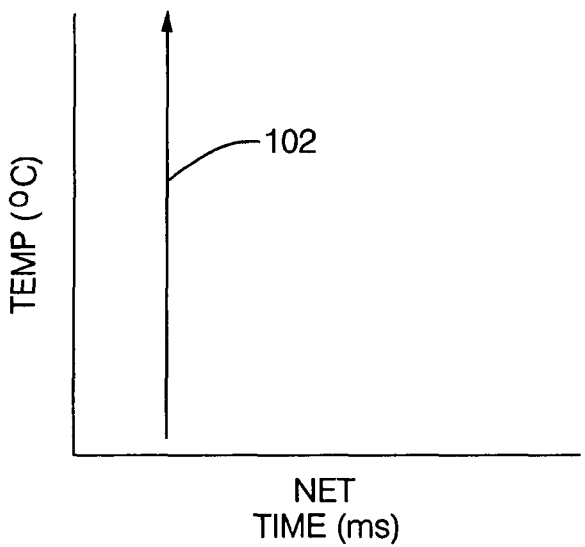
FIG. 6 is a graph of a curve illustrating a nominal ejection time interval for the compact disc player.
Figure 7:
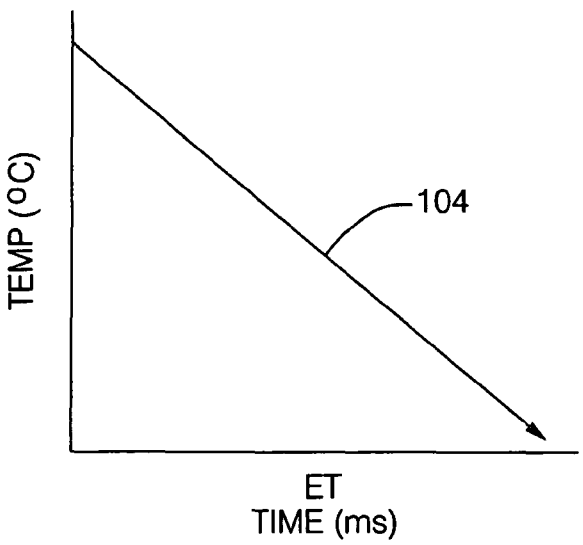
FIG. 7 is a graph of a curve illustrating offset ejection time interval values for the compact disc player based on temperature values of the compact disc player.

(NET) corresponds to a nominal ejection time value; and
(OET) corresponds to an offset ejection time value which is a function of the temperature value. Referring to FIGS. 5-7, curves representing exemplary values of (ET), (NET), and (OET) are illustrated. In particular, a curve 102 illustrates that the nominal ejection time value (NET) of the compact disc player 10 can be substantially constant over a predetermined temperature range. Further, a curve 104 illustrates that the offset ejection time value (OET) can increase as a temperature of the compact disc player 10 decreases. Finally, a curve 106 illustrates that the ejection time value (ET) can increase as a temperature of the compact disc player 10 decreases.

Referring again to FIG. 4, at step 88, the controller 36 makes a determination as to whether the ejection switch 30 has been actuated. If the value of step 88 equals "yes", the method advances to step 90. Otherwise, the method returns to step 80.

At step 90, the controller 36 makes a determination as to whether the ejection sensor 34 detects movement of the compact disc 12. If the value of step 90 equals "yes", the method advances to step 92. Otherwise, the method returns to step 90.

At step 92, controller 36 generates a signal to induce a motor drive circuit 20 to energize a motor 18 coupled to a drive mechanism for a time internal corresponding to the ejection time interval value (ET), to induce the drive mechanism to move the compact disc 12 to a predetermined position outwardly from the compact disc player 10. After step 92, the method is exited.

As described above, the method for controlling ejection of a compact disc 12 from the compact disc player 10 can be embodied in the form of computer-implemented software algorithms and apparatuses for practicing those processes. In an exemplary embodiment, the method is embodied in computer program code executed by one or more elements. The present method may be embodied in the form of computer program code containing instructions stored in tangible media, such as floppy diskettes, CD-ROMs, hard drives, flash memory, or any other computer-readable storage medium, wherein, when the computer program code is loaded into and executed by a computer, the computer becomes an apparatus for practicing the invention.

It should be noted that in an alternate exemplary embodiment, the method for controlling ejection of a compact disc 12 from the compact disc player 10 can be implemented utilizing circuit components and electronic circuitry, instead of software algorithms implemented by the controller 36.

The compact disc player 10 and the method for controlling ejection of the compact disc 12 from the compact disc player 10 provide a substantial advantage over other systems and methods. In particular, the compact disc player 10 utilizes a temperature sensor to measure a temperature of the compact disc player 10 and thereafter calculates an ejection time interval for ejecting the compact disc 12 therefrom, based on the temperature. Thereafter, a motor can be energized for the ejection time interval to move the compact disc 12 to a desired ejection position even when the compact disc player 10 is exposed to temperature levels over a relatively large temperature range.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for ejecting a compact disc from a compact disc player to a desired position over a range of operating temperatures of the compact disc player, said method comprising:
    determining a temperature of the compact disc player;
    determining a time duration that an ejection motor must be energized in order to eject the compact disc to the desired position, wherein the time duration is based on the temperature; and
    energizing the motor for the time duration in order to eject the compact disc to the desired position.

2. A compact disc player, comprising:
    a housing;
    a temperature sensor configured to generate a signal indicative of a temperature of the compact disc player;
    a motor coupled to a drive mechanism for ejecting a compact disc outside the housing; and
    a controller located within the housing for receiving the signal from the temperature sensor, the controller configured to determine a time duration that an ejection motor must be energized, based on the signal from the temperature sensor, in order to eject the compact disc to a desired position outwardly from the housing, the controller further configured to energize the motor for the time duration.

3. The compact disc player of claim 2, further comprising an ejection switch operably coupled to the controller, the controller further configured to determine when the ejection switch has been actuated prior to energizing the motor.

4. A compact disc player comprising:
    a housing;
    a motor coupled to a drive mechanism to eject a compact disc outside the housing;
    a temperature sensor; and
    a computer storage medium having a computer program encoded therein for controlling ejection of the compact disc from the compact disc player, the computer storage medium comprising:
    code for receiving a signal indicative of a temperature of the compact disc player from the temperature sensor;
    code for determining a time duration that an ejection motor must be energized, based on the signal from the temperature sensor, in order to eject the compact disc to a desired position outwardly from the housing; and
    code for energizing the motor for the time duration.

5. The compact disc player of claim 4, wherein the computer storage medium further comprises code for determining when an ejection switch has been actuated prior to energizing the motor.

6. The method of claim 1, further comprising providing an ejection switch and determining when the ejection switch has been actuated prior to energizing the motor.

7. The method of claim 1, wherein the time duration is determined by a method comprising:
    providing a nominal ejection time value as a function of a predetermined temperature;
    providing an offset ejection time value as a function of the temperature; and
    calculating the time duration as a function of the nominal ejection time value and the offset ejection time value.

8. The method of claim 7, wherein the temperature is determined in response to an actuation of a switch.

* * * * *